Figure 1:
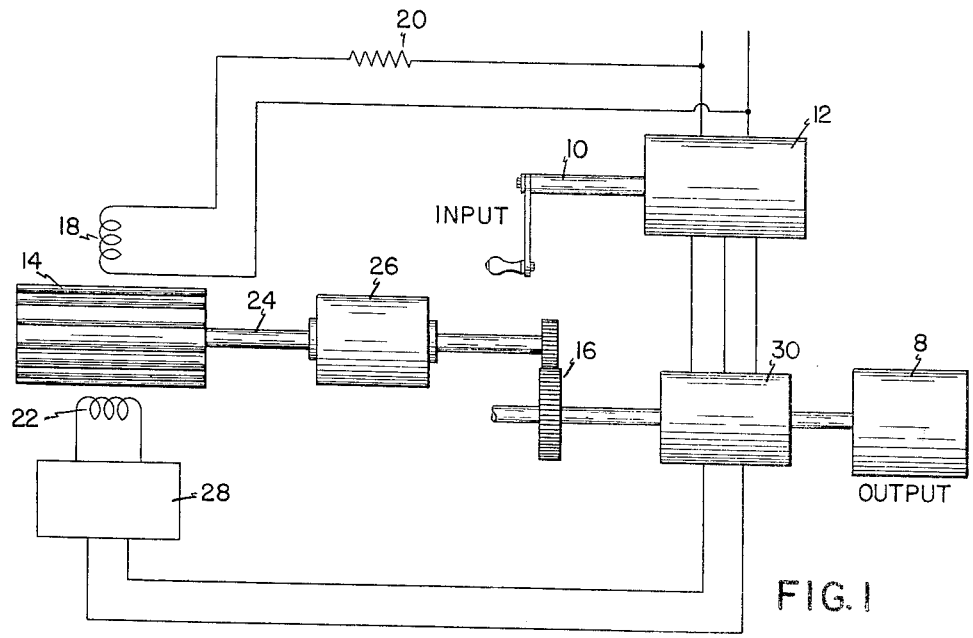

July 25, 1950          A. C. HALL          2,516,698

CONTROL SYSTEM

Filed June 6, 1946          2 Sheets—Sheet 1

INVENTOR.
ALBERT C. HALL
BY Melvin R. Jenney
Attorney

July 25, 1950

A. C. HALL 2,516,698

CONTROL SYSTEM

Filed June 6, 1946

2 Sheets-Sheet 2

INVENTOR.
ALBERT C. HALL
BY *Melvin R. Jenney*
*Attorney*

Patented July 25, 1950

2,516,698

UNITED STATES PATENT OFFICE 2,516,698

CONTROL SYSTEM

Albert C. Hall, Boston, Mass., assignor, by mesne assignments, to Research Corporation, New York, N. Y., a corporation of New York Application June 6, 1946, Serial No. 674,741

3 Claims. (Cl. 318—30)

The present invention relates to control systems, and more specifically to positional control systems or servomechanisms wherein an object is positioned or otherwise actuated in accordance with prescribed functions of differences in position or condition between the controlled and a controlling object.

In the design of many servomechanisms it is frequently desirable to employ as the driving motor or servomotor a type of motor whose output torque is substantially proportional to the input to the motor. Such a motor may be a two-phase induction motor, one phase of which is excited by a constant reference voltage, while the other phase is excited by a control voltage, the magnitude of which determines the torque or speed developed, while the direction of rotation is determined by the phase of said controlled voltage relative to the reference voltage.

While such a motor control system provides a simple and flexible control of the motor output, the relatively wide variation in output speed with variations in load or torque, for a given input, generally renders the variable speed induction motor and several other types of variable speed electric motors unsuitable for use in servomechanisms where a fast and accurate response are required. Certain arrangements have been proposed for stabilizing servomechanisms wherein servomotors of this general type are employed but such systems are generally of a complex character, involving the use of special servocontrollers incorporating specially designed compensating networks.

It is the object of the present invention to provide, in a servomechanism employing as the servomotor a relatively simple driving motor of the type whose output torque is substantially proportional to the motor input, or error signal, novel stabilizing means for insuring a fast and accurate servo response over a relatively wide range of operating conditions.

More specifically it is an object of the invention to provide a servomechanism having as the servomotor a motor capable of providing a continuously rotating output with a torque substantially proportional to the error, said servomechanism being stabilized by relatively simple mechanical means without requiring the use of a special servocontroller.

In accordance with these objects, the present invention contemplates the provision of stabilizing means associated with the driving motor of the servomechanism, said stabilizing means comprising a rotatable mass coupled to the driving motor or servo output by elastic constraint and viscous coupling. In order that this stabilizing means may be effective for its intended purpose, certain criteria have been established, as will hereinafter more fully appear.

Figure 2:
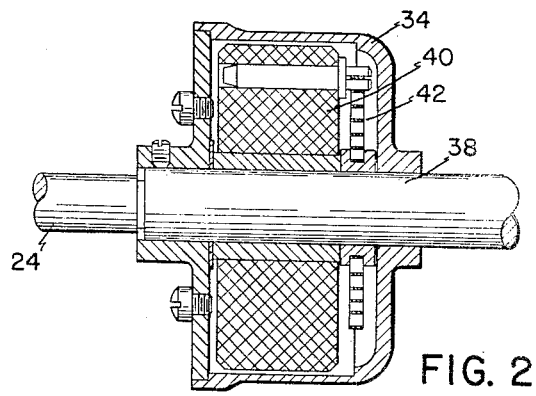
Figure 6:
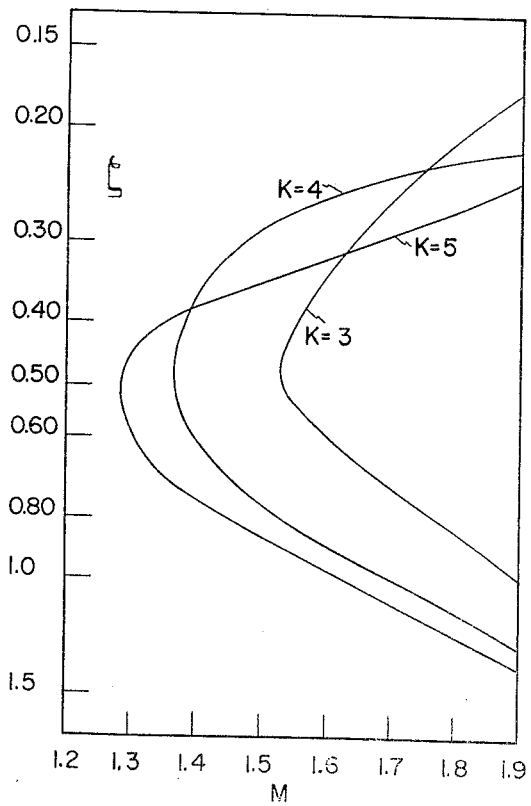
Figure 7:
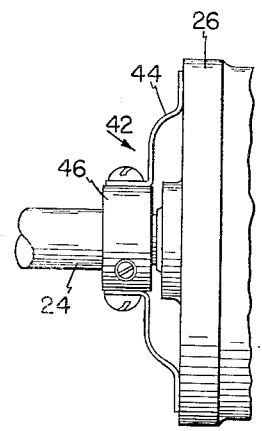

In the drawings illustrating the invention, Fig. 1 is a view, partly diagrammatic, of a servomechanism or positional control system embodying the invention; Fig. 2 is a sectional elevation of the servo stabilizing means according to the invention; and Figs. 3 to 6 are diagrams illustrating the operation of the device, and Fig. 7 is a detail view showing another form of the device.

As has been indicated, the invention is concerned with control systems of the type wherein an object, represented by a mass $8$, is rotatably positioned in accordance with the setting of an input shaft $10$ or other data source connected to a synchro generator $12$, while the actuation of the object $8$ is effected by a driving motor $14$ through speed reduction gearing $16$.

The driving motor $14$ in the illustrated embodiment is of the two-phase induction type, having one field winding $18$ excited from a source of alternating current through an adjustable phase-shifting resistor $20$. The other field winding $22$ is supplied with an A. C. voltage, the magnitude and phase of which are controlled in such manner as to produce the required speed and direction of rotation of the motor to maintain correspondence in position between the controlled object $8$ and the controlling device $10$. The motor shaft $24$ carries the stabilizing device $26$ to be hereinafter described in detail.

The control voltage for the motor is provided by the servo controller indicated generally at $28$ and comprising an A. C. amplifier of conventional design having substantially constant amplification or gain over the operating range of frequencies. The amplifier input signal is provided by electrical "synchro" type apparatus comprising the synchro generator or transmitter $12$, and a synchro transformer $30$ connected to the load $8$. Thus the servo input and output positions are continuously compared, and an A. C. signal is supplied to the amplifier, if an error exists, of proper phase and magnitude to correct such error.

The system without the stabilizing means is of well-known form, but is generally unsuited to practical use. This can be shown by the following analysis:

Let $J_m$ = the moment of inertia of the motor plus load
$f_m$ = the coefficient of damping of the motor and load (assuming viscous damping)
$K_p$ = the gain of the servo controller times the torque constant of the motor
$\Theta_i(j\omega)$ = displacement of the input shaft from some neutral reference position, expressed as a function of frequency
$\Theta_o(j\omega)$ = displacement of the output shaft from neutral
$E(j\omega) = \Theta_i - \Theta_o$ = "error" between input and output It is now necessary to express the transfer-function of the controller and motor. The transfer function is the ratio of output to input of any device as a function of frequency and is indicated by the notation $KG(j\omega)$. For a servomechanism, the transfer-function is the ratio of output to "error," because the "error" constitutes the input to the servo controller. Thus, $$KG(j\omega) = \frac{\Theta_o(j\omega)}{E(j\omega)}$$

The transfer-function involves a constant term $K$ and a frequency dependent term $G(j\omega)$.

For the servo of Fig. 1 (still assuming that no stabilizing means is used), it can be shown that the transfer function is $$KG(j\omega) = \frac{K_p}{j\omega(J_m j\omega + f_m)} \quad (1)$$

If the damping is considered negligible, this reduces to $$KG(j\omega) = -\frac{K_p}{J_m} \frac{1}{\omega^2} \quad (2)$$

Further analysis may be most effectively carried out by a plot of the function $KG(j\omega)$. In general, for any frequency $\omega$, $KG(j\omega)$ is a complex quantity and its magnitude and phase can be plotted. For stability, the curve should lie entirely to the right of the point $-1+j0$; (or more generally, the polar plot must not "enclose" the point $-1+j0$, for reasons identical with those given by H. Nyquist in "Regeneration Theory" published in the Bell System Technical Journal, January, 1932; this is explained for the case of servomechanisms in my paper "The Analysis and Synthesis of Linear Servomechanisms," a "restricted" publication of Massachusetts Institute of Technology published in 1943). In this particular case, the plot lies along the negative real axis as shown by the line A in Fig. 3. Since it passes through the point $-1+j0$, the system is indicated as being unstable. This is for the assumed condition of zero damping; actually there is necessarily a small amount of damping, so that the plot would pass slightly below the critical point, as shown at B, and the system would be mathematically stable, but the time of transient decay would be too long for practical use.

According to the present invention such a system may effectively be stabilized to provide a fast and accurate positional control system without the use of special electrical circuits or devices of complex nature and construction. The stabilizing means of the invention, indicated generally at 26, is mounted directly on the shaft 24 of the output driving motor 14.

The stabilizer, illustrated in detail in Fig. 2, comprises a cylindrical fluid-tight housing 34 adapted to be secured to the motor shaft 24 by a clamping device 36. Within the housing and mounted for rotation about a hollow sleeve 38 is a cylindrical mass 40. The mass is coupled to the housing, and therefore to the motor shaft, by means of a spring 42, one end of which is secured to the mass and the other end to the housing. The spring contains a number of convolutions, so as to permit relative rotation of mass and housing to the extent of at least one turn, and preferably several turns, in either direction. A damping fluid is contained in the housing.

To show the operation of the compensated system, let $J_A$ = moment of inertia of the stabilizing mass 40
$f_A$ = damping coefficient of the damping medium in the housing 34
$k_A$ = spring constant of spring 42

$$r^2 = \frac{J_A}{J_m}$$

$$\zeta_A = \frac{f_A}{2\sqrt{k_A J_A}} = \text{damping factor}$$

$$\omega_1 = \sqrt{\frac{k_A}{J_A}} = \text{undamped natural frequency of the system composed of the mass 40 and spring 42.}$$

The transfer function of the whole system is found to be $$KG(j\omega) = -\frac{K_p}{J_m} \frac{-\omega^2 + 2j\zeta_A \frac{\omega_1}{r}\omega + \frac{\omega_1^2}{r^2}}{\omega^2\left[-\omega^2 + 2j\frac{1+r^2}{r}\zeta_A\omega_1\omega + \frac{1+r^2}{r^2}\omega_1^2\right]} \quad (3)$$

which is equivalent to multiplying the transfer function $$-\frac{K_p}{J_m\omega^2}$$

of Equation 2 into what may be termed a lead-controlling function of a type generally described in my copending application Serial No. 560,184, filed October 24, 1944, now Patent No. 2,496,391, dated February 7, 1950.

Figure 3:
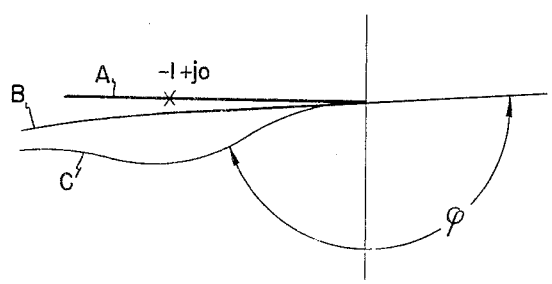
Figure 4:
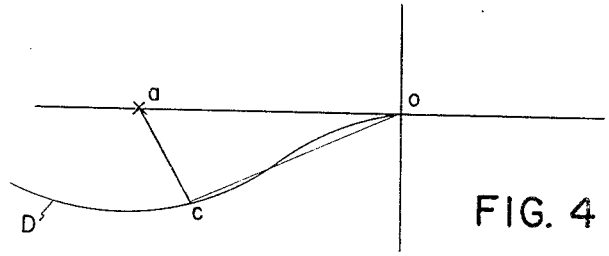

A typical plot C of transfer-function of the complete system is shown at C in Fig. 3. It will be noted that at any given frequency, the lag angle $\phi$ as measured from the positive real axis is now less than 180°, whereas, the lag angle for each point of the original locus A is exactly 180°. The new plot does not "enclose" the critical point $-1+j0$ and is therefore stable.

The constants $K_p$, $\zeta$ and $r$ may now be determined for optimum performance. In my copending application above referred to, I have shown that in the general case, optimum improvement in the transient response of a servo may be effected by neutralizing lag-producing elements by individual lead-control elements. The present invention does not lend itself to this treatment since it is not possible to realize a physical device having a numerator term to cancel the denominator term of expression (2). The constants may however be determined by the procedure outlined in my above-mentioned paper which will now be briefly described.

For this purpose the ratio of output displacement to the servo input displacement (not error) is required. It is $$\frac{\Theta_o(j\omega)}{\Theta_i(j\omega)} = \frac{KG(j\omega)}{1+KG(j\omega)} \quad (4)$$

The analytical expression obtained by substituting (3) into (4) is practically unworkable, but satisfactory criteria for choice of constants can be made from the polar plot of (3). A simple graphical procedure for determining the best value of K for any servomechanism is described in my above-mentioned paper. For purposes of this description, it will be sufficient to note that the value of K is preferably so chosen that at the point of closest approach of the transfer-locus to the critical point $-1+j0$, the ratio of output to input will have a value within a certain range. Thus in Fig. 4, a typical transfer-locus D is shown. The origin is indicated at $o$, the critical point at $a$, and the point of closest approach at $c$. The maximum ratio of output to input is given by $$\frac{oc}{ac}$$

This ratio is designated $M$. The preferred value of $M$ is about 1.33, which means that for the "resonant" frequency of the system, the amplitude of the output oscillations will be 1.33 times the amplitude of the input oscillations. Actually although 1.33 has been found best from experience, the value of $M$ may be within a range from 1.1 to 1.6, and may be allowed to run as high as 2.5 in many instances. If $M$ is too small the system is sluggish, and if it is too large the system may develop transient oscillations of too great magnitude. For any given servo, the best value of $K$ may be determined by making plots for different $K$-values and choosing the one that gives the desired value of $M$. It will be understood that $K$, since it involves the amplifier gain, is subject to ready adjustment.

For some systems, of which the uncompensated system heretofore described is an example, it will be found that there is no value of $K$ that will produce a satisfactory $M$. It is the main purposes of the invention to provide compensating means whereby satisfactory operation can be attained.

Equation 3 involves not only the gain-factor $K$, but the damping constant $\zeta$ and the inertia ratio $r^2$. To determine the best values of these, a number of plots can be made for different values of $K$, $\zeta$ and $r^2$. This work may be facilitated by plotting only that portion of (3) which does not involve $K$, leaving $K_p$ for later determination, that is, by plotting only $$G(j\omega) = \frac{-\omega^2 + 2j\zeta_A \frac{\omega_1}{r}\omega + \frac{\omega_1^2}{r^2}}{\omega^2\left[-\omega^2 + 2j\frac{1+r^2}{r}\zeta_A\omega_1\omega + \frac{1+r^2}{r^2}\omega_1^2\right]} \quad (5)$$

Figure 5:
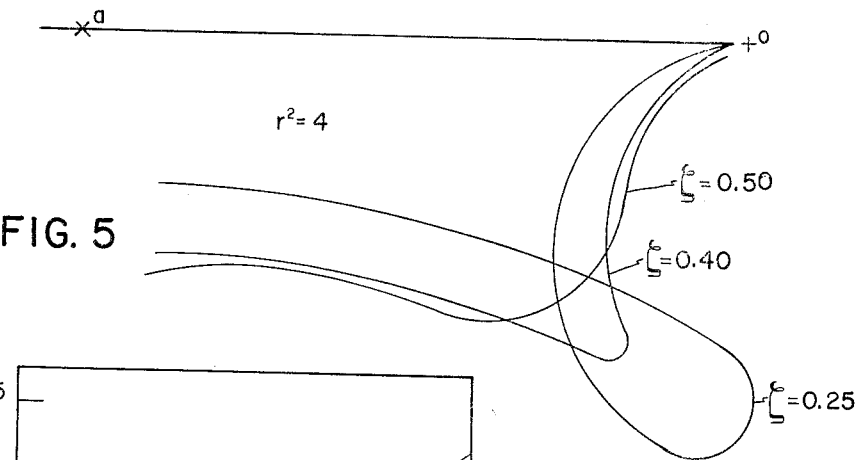

Polar plots of (5) for several values of $\zeta$ are given in Fig. 5. In these plots $r^2$ is constant and equal to 4. The kink or loop that appears in one of these curves is of considerable importance and will be discussed later.

In a system which is to operate under varying temperature conditions the damping factor may vary considerably. Bearing in mind that $r^2$ must remain fixed and that it is not convenient to change $K$ in service, the object is to obtain a satisfactory $M$-value over a wide range of the damping factor. This can be accomplished if $r^2$ is fairly large. From the data given by the polar plots of Fig. 5, a relation between $M$ and $\zeta$ may be found for any constant values of $K$ and $r^2$. Fig. 6 shows such a relation for $r^2=4$ and $K=3$, 4 or 5. This graph shows that satisfactory performance may be obtained over a wide range of variation of the damping constant $\zeta$. Thus, with $K=5$, $\zeta$ may vary from about 0.35 to 0.84 without allowing $M$ to go above 1.5. The minimum value of $M$ is about 1.28 for $\zeta=0.50$. With typical fluids this covers a temperature range of about 70° F., thus a servo of the present invention would operate with an $M$-value not greater than 1.5 over a range of say 20 to 90° F. This range could be considerably extended by allowing a greater value of $M$ at the high- and low-temperature ends of the range; thus with a limit of $M=1.9$, $\zeta$ may vary between about 0.24 and 1.3. It will be noted that satisfactory operation would likewise be attained with $K=4$.

From an analysis of such plots for a wide variety of values of the various constants I have discovered that two different operating conditions occur in two different ranges of the value of $r$. In the first case when $r^2$ is fairly large, that is, when the moment of inertia of the stabilizing mass is large with respect to the moment of inertia of the motor and load, the system is relatively insensitive to variations in the damping factor; second when the value of $r^2$ is small the system is also highly useful for stabilization if the damping constant is accurately determined with relation to $r^2$ and maintained within fairly close limits. The first condition, namely, a high inertia ratio, is illustrated in the plots of Figs. 5 and 6. In general, if $r^2>1$, the feature of insensitivity to temperature changes is attained. Thus for an aircraft instrument servo, where a wide range of temperature may be encountered, $r^2$ should be large, preferably about 4, as illustrated in Figs. 5 and 6.

Before describing the case of a small inertia ratio (e. g. $r^2<1$), attention is directed to a peculiarity in the plot of Fig. 5 for $\zeta=0.25$. This plot exhibits a decided kink or loop, which means that the transfer-function has the same value for two different values of frequency. It can be shown by analysis that this loop always appears when $\zeta$ is small enough, and in fact, whenever $$\zeta < \frac{r}{4}\sqrt{\frac{16+r^2}{(1+r^2)(4+r^2)}} \quad (6)$$

The value of $\zeta$ for which the loop barely disappears is designated $\zeta_k$ and is given by $$\zeta_k = \frac{r}{4}\sqrt{\frac{16+r^2}{(1+r^2)(4+r^2)}} \quad (7)$$

In the plot of Fig. 5, for $r^2=4$, $\zeta_k=\sqrt{1/8}=0.354$. Thus the plot for $\zeta=0.25$ shows a loop, while the plots for larger $\zeta$ show no such loop, although the plot for $\zeta=0.40$ illustrates a decided bend. For a large value of $r^2$, as represented by Fig. 6, it will be observed that operation is satisfactory in both the loop region where the damping factor is slightly less than $\zeta_k$ and in the non-loop region where the damping factor may extend to much larger values.

The fact that the plot has a loop does not appear to be significant in itself, but it will be noted that when $\zeta$ is materially less than $\zeta_k$, the plot tends to rise toward the critical point $a$, as indicated by the plot for $\zeta=0.25$ in Fig. 5. Whenever $\zeta$ can be maintained constant the optimum value is one near $\zeta_k$ or slightly greater. This fact is availed of to give satisfactory performance in a servomechanism in which it may be necessary to have a small value of $r^2$. While the use of a relatively large stabilizing mass is allowable in small servomechanisms, such as instrument servos, for example, it may not be practicable in larger systems to use a stabilizing mass which is several times that of the motor and load. In such a case, if the damping factor is chosen close to $\zeta_k$, or preferably slightly larger, the mechanism will be satisfactorily stabilized.

If $r^2=0.5$, for example, $\zeta_k=0.273$. A damping constant $\zeta=0.35$ may be used. Then $M=2.21$, which is satisfactory for many applications. It will be understood, however, that the damping constant must in such a case be held within fairly close limits and this requires that the servomechanism be operated under reasonably constant temperature conditions.

A modified form of the invention is shown in Fig. 7. This is similar to Fig. 2 except that the stabilizing unit 26 is not rigidly connected to the shaft 24 but is connected through a slipping clutch 42. The clutch may take any suitable form, here shown as a number of spring fingers 44 carried on a collar 46 on the shaft and bearing against the stabilizer housing. This construction is desirable when large inertia ratios are used. The purpose of the slipping clutch is to improve operation under conditions of rapid change of speed. The direct connection, as shown in Fig. 2, would be most suitable if the transfer function of the servomechanism were exactly expressed by Equation 1. However, the derivation of the equation depends upon the assumption that the torque of the motor 14 is proportional to the "error." This is true for small values of error but if the error is large the relation between torque and error becomes non-linear and the torque approaches a saturation value. Thus, upon rapid changes of speed when a large stabilizing mass is used, the motor may not have available a sufficient torque to cause it to operate in accordance with the theoretical principles heretofore described. Another saturation effect which produces a similar result is that due to complete winding up of the spring on rapid changes of speed. The slipping clutch 42 allows the stabilizing mass to slip with respect to the motor shaft whenever, because of saturation or non-linear effects, the torque required for accelerating the mass cannot be furnished by the motor. In such a case the load is allowed to respond quickly to the change of speed and the stabilizing mass simply slips with respect to the shaft. Under all other conditions the unit performs its stabilizing function in accordance with the theory heretofore described.

The system of the present invention differs markedly from the mere application of damping. It will be understood that a simple servo of the type herein described may be stabilized merely by applying friction or damping to the output. That would require an excessive amount of power to be continuously wasted in the damping medium; in fact, satisfactory damping would require wastage of two to four times as much power in the damping medium as is required for the load. According to the present invention, energy is dissipated in the damping medium only when the speed is changing. Under constant velocity the stabilizing mass turns with the load without any consumption of energy beyond that due to incidental friction effects.

Although the stabilizing device of the present invention has been described as embodied in a control system using a particular kind of motor, it will be understood that it may be used with servomotors of other form. The stabilizer is a form of lead-control device, the general principles of which are set forth in my above-mentioned patent, and may be used to improve the transient response of any servo in the manner therein described.

Having thus described the invention, I claim:

1. An automatic control system comprising a controlled object, a controlling object, a servomotor for actuating the controlled object, control means for controlling the servomotor, said control means being responsive to differences in condition between controlling and controlled objects, and stabilizing means comprising a housing rotatable with the motor, a rotary mass within the housing, a coiled spring connecting the servomotor with the mass to wind and unwind upon relative movement between the motor and mass, a viscous damping medium in the housing, the spring and damping medium both acting to apply a torque to the mass when the motor and said mass are rotating at different speeds, the moment of inertia of said stabilizing means being large compared to that of the servomotor and controlled object.

2. An automatic control system comprising a controlled object, a controlling object, a servomotor for actuating the controlled object, control means including an amplifier for controlling the servomotor, said control means being responsive to differences in condition between controlling and controlled objects, and stabilizing means comprising a rotary mass, a coiled spring and a viscous damping medium connecting the servomotor and the mass, the spring arranged to wind and unwind upon relative movement between the motor and mass, the spring and damping medium both acting to apply torques to the mass when the motor and said mass are rotating at different speeds, the moment of inertia of said stabilizing means being large compared to that of the servomotor and controlled object.

3. An automatic control system comprising a controlled object, a servomotor for actuating the controlled object, said motor comprising an induction type motor having at least two phases, means for supplying a reference voltage to one phase, a controller including an amplifier responsive to an error signal generated by differences in condition between controlling and controlled objects for supplying to another phase of the servomotor a voltage substantially proportional to said error signal, and stabilizing means comprising a rotary mass, a coiled spring and a viscous damping medium connecting the servomotor and the mass, the spring arranged to wind and unwind upon relative movement between the motor and mass, the spring and damping medium both acting to apply torques to the mass when the motor and said mass are rotating at different speeds, the moment of inertia of said stabilizing means being large compared to that of the servomotor and controlled object.

ALBERT C. HALL.

REFERENCES CITED

The following references are of record in the file of this patent:

UNITED STATES PATENTS

| Number | Name | Date |
| --- | --- | --- |
| 1,271,362 | Rainey | July 2, 1918 |
| 2,184,576 | Beyerle | Dec. 26, 1939 |
| 2,361,790 | Noxon | Oct. 31, 1944 |
| 2,403,605 | Lesnick | July 9, 1946 |
| 2,454,980 | Sobell | Nov. 30, 1948 |

FOREIGN PATENTS

| Number | Country | Date |
| --- | --- | --- |
| 11,957 | Great Britain | of 1912 |